United States Patent [19]
Chung

[11] Patent Number: 5,815,691
[45] Date of Patent: Sep. 29, 1998

[54] METHOD FOR CONTROLLING AN EXTERNAL MEMORY FOR A CD-ROM DECODER AND APPARATUS THEREFOR

[75] Inventor: Sung-hyun Chung, Suwon, Rep. of Korea

[73] Assignee: Samsung Electronics Co., Ltd., Kyungki-Do, Rep. of Korea

[21] Appl. No.: 774,494

[22] Filed: Dec. 30, 1996

[30]  Foreign Application Priority Data

Apr. 10, 1996 [KR] Rep. of Korea ................... 1996 10784

[51] Int. Cl.$^6$ ........................................................ G06F 1/04
[52] U.S. Cl. ............................................ 395/555; 395/559
[58] Field of Search .................................... 395/555, 559, 395/872; 711/100; 369/47, 48, 60, 275.3

[56] References Cited

U.S. PATENT DOCUMENTS 5,640,383  6/1997  Kamoto et al. ....................... 369/275.3
5,694,383  12/1997  Arataki et al. ............................. 369/59

*Primary Examiner*—Dennis M. Butler
*Attorney, Agent, or Firm*—Sughrue, Mion, Zinn, Macpeak & Seas, PLLC

[57] ABSTRACT

A method and apparatus for controlling an external memory for a CD-ROM decoder capable of smoothly performing subcode storage, read and write operations of microcomputer data, and a refresh cycle in the case where the external memory is a DRAM, without having an influence on fundamental CD-ROM decoder functions such as error correction, buffering and pickup data transmission to a host. The CD-ROM decoder includes a byte clock and master clock. The method includes outputting the byte clock upon an occurrence of six periods of the master clock, wherein the byte clock and the master clock each have first and second levels; allotting a portion of a first period of the master clock having the first level for performing a buffering operation; allotting a portion of a second period of the master clock having the first level for performing one of a refresh cycle operation, a subcode storage operation, and data read and write operations of the CD-ROM controlling microcomputer with respect to the external memory; allotting a portion having the first level of the third through sixth periods of the master clock for performing an error correction operation; allotting a portion having the second level of the first through sixth periods of the master clock for transmission to the host of the picked-up CD-ROM data, whereby the external memory is accessed.

8 Claims, 6 Drawing Sheets

METHOD FOR CONTROLLING AN EXTERNAL MEMORY FOR A CD-ROM DECODER AND APPARATUS THEREFOR

BACKGROUND OF THE INVENTION

1. Field of the Invention

The present invention relates to a method for controlling a compact disk read-only-memory (CD-ROM) decoder, and more particularly, to a method for controlling an external memory used in performing digital signal processing and subcode storage for a CD-ROM decoder, and in providing a microcomputer interface.

2. Description of the Related Art

FIG. 1 is a block diagram showing a typical CD-ROM decoder, and FIG. 2 shows a format of data processed in a CD controlling unit 100 of the CD-ROM decoder shown in FIG. 1.

Referring to FIG. 1, the CD controlling unit 100 includes a servo controlling microcomputer 102, a servo unit 104, a pickup unit 106, an equalizer 108 and a first signal processing unit 110. A CD decoding unit 114 of the CD-ROM decoder includes a CD-ROM controlling microcomputer 116, a second signal processing unit 118, a host interface unit 120 and an external memory unit 122.

The servo unit 104 controls the pickup unit 106 under the control of servo controlling microcomputer 102 to pickup channel data from an optical disk (not shown). The equalizer 108 equalizes the picked-up channel data and generates a frame 20 from 588 channel bits in the form of eight-to-fourteen modulation (EFM) signals as shown in FIG. 2, in order to transmit the same to first signal processing unit 110. The first signal processing unit 110 demodulates the received EFM signals into an 8-bit subcode 23 and 32-byte CD data 24, excluding a 24-bit sync signal 21 and a 3-bit connecting signal 22. Moreover, the first signal processing unit 110 cross-interleave-Reed-Solomon-code (CIRC) corrects the errors in the 32-byte CD data 24 to obtain 24-byte final data 25. If the picked-up channel data is audio data, then left and right channels are combined in groups of 16 bits for each frame to form 12 words. If the CIRC error-corrected data is CD-ROM data, 24 bytes constitutes one frame for transmitting the same to CD decoder unit 114.

The CD decoder unit 114 receives the CD-ROM data in units of a byte from CD controlling unit 100. The second signal processing unit 118 in CD decoder 114 generates a frame of 24-bytes of data and a CD-ROM data block of 98 frames. Also, the second signal processing unit 118 stores the CD-ROM data blocks in external memory 112 for use in signal process in which each CD-ROM data block contains 2,352 bytes. Furthermore, the first 12 bytes of the CD-ROM data block, ranging from the first byte to the 12th byte, are combined with each other to form sync patterns and are signal-processed for discriminating CD-ROM data blocks.

After second signal processing unit 118 of CD decoder unit 114 digital-signal-processes the data, 2,048 bytes of user-exclusive data is transmitted to a host (not shown) via host interface 120.

A conventional CD-ROM decoder has the problem that it does not have a portion of a master clock specially allotted for performing various functions, in addition to its fundamental functions, for providing access to external memory 122. Thus, it is difficult to effectively perform various functions such as a refresh cycle for accessing the external memory 122 if it is a type of memory which requires refreshing, and performing read and write operations of microcomputer data or subcode storage.

SUMMARY OF THE INVENTION

To remove or reduce the above described problems, an object of the present invention is to provide a method for controlling an external memory for a CD-ROM decoder capable of smoothly performing a subcode storage operation, microcomputer data read and write operations, and a refresh cycle in the case where an external memory is a DRAM (direct random access memory), without influencing the fundamental functions of the CD-ROM decoder, such as error correction or buffering, and transmission of pickup data to a host.

To achieve above object, there is provided a method for controlling an external memory for a CD-ROM decoder which transmits CD-ROM data picked-up from a disk to a host under control of a CD-ROM controlling microcomputer, in which one-byte of data is transmitted during one period of a byte clock, and which has a master clock portions of which are allocated for different functions in synchronization with the period of the byte clock, the method for controlling the external memory comprises: outputting the byte clock upon an occurrence of a predetermined number of periods of the master clock, wherein the byte clock and the master clock each have first and second level; allotting a portion of a first period of the master clock having the first level for performing a buffering operation; allotting a portion of a second period of the master clock having the first level for performing one of a refresh cycle operation, a subcode storage operation, and data read and write operations of the CD-ROM controlling microcomputer with respect to the external memory; allotting a portion having the first level of third through the predetermined number of periods of the master clock for performing an error correction operation; allotting a portion having the second level of the first through the predetermined number of periods of the master clock for transmission to the host of the picked-up CD-ROM data, whereby the external memory is accessed.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENT

A preferred embodiment of the present invention is described below in more detail with reference to the above drawings.

Figure 1:
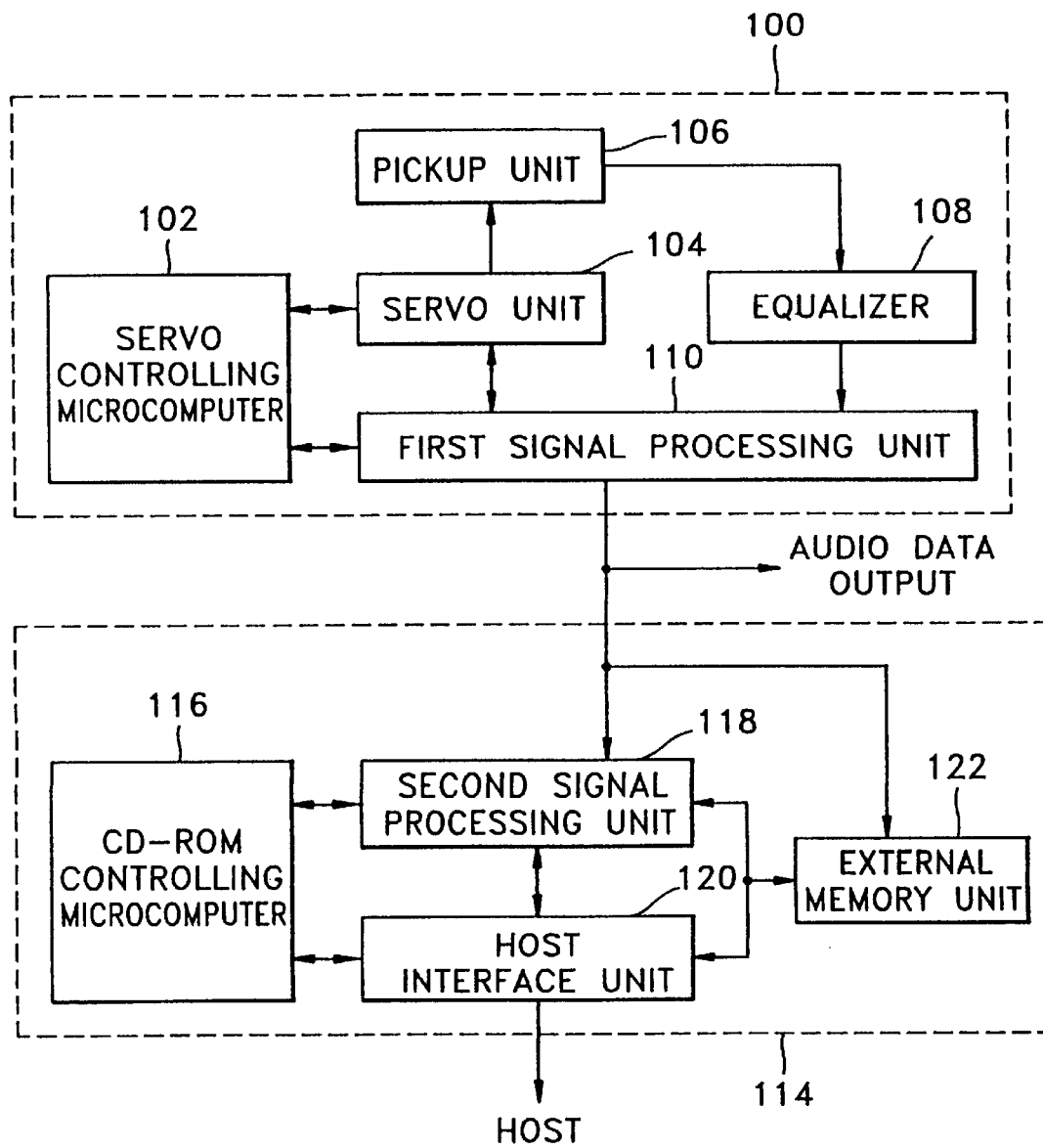
FIG. 1 a block diagram of a CD-ROM decoder applied to the present invention.
Figure 2:
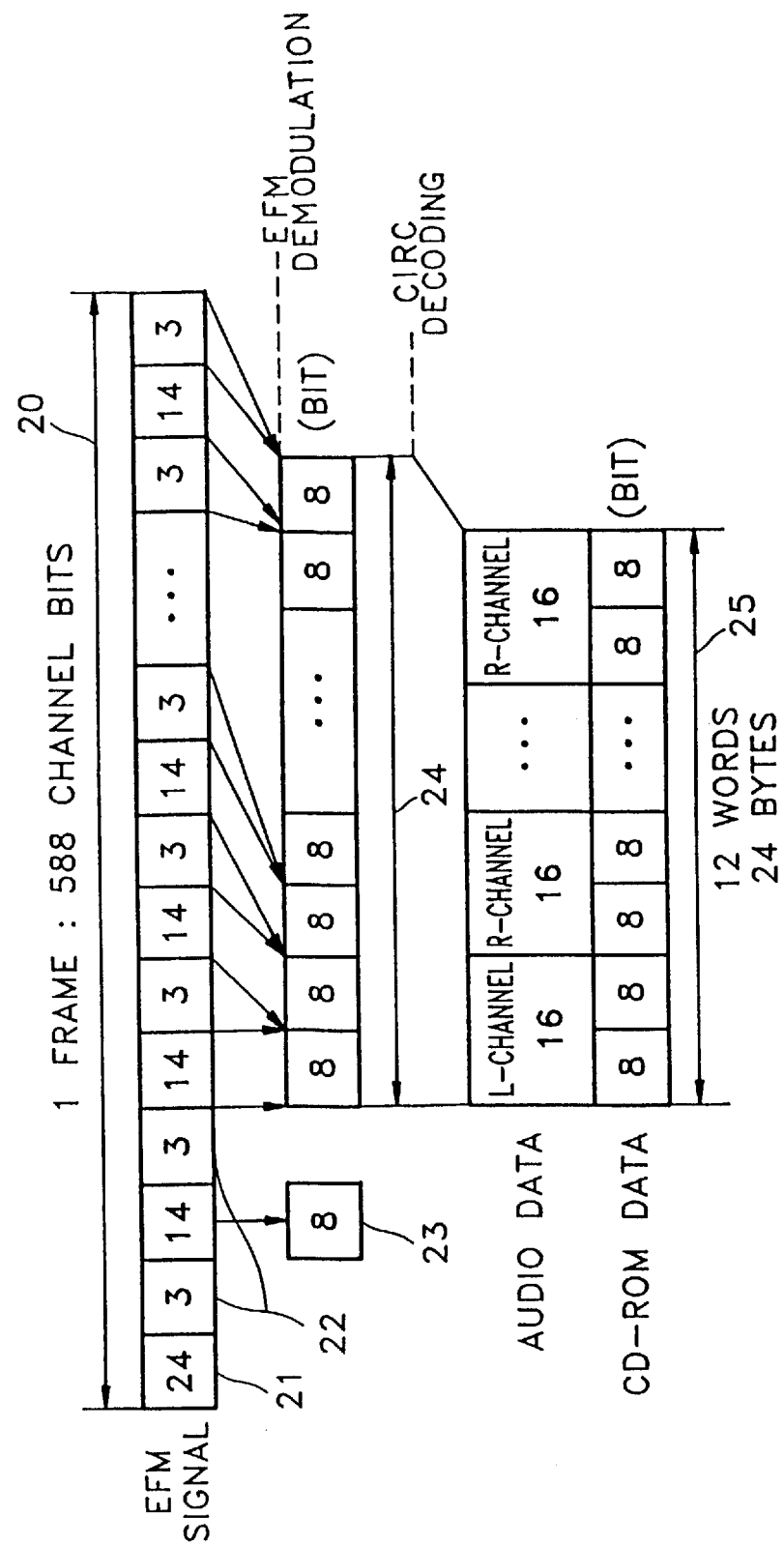
FIG. 2 shows a format of data processed in the CD controlling unit shown in FIG. 1.
Figure 3:
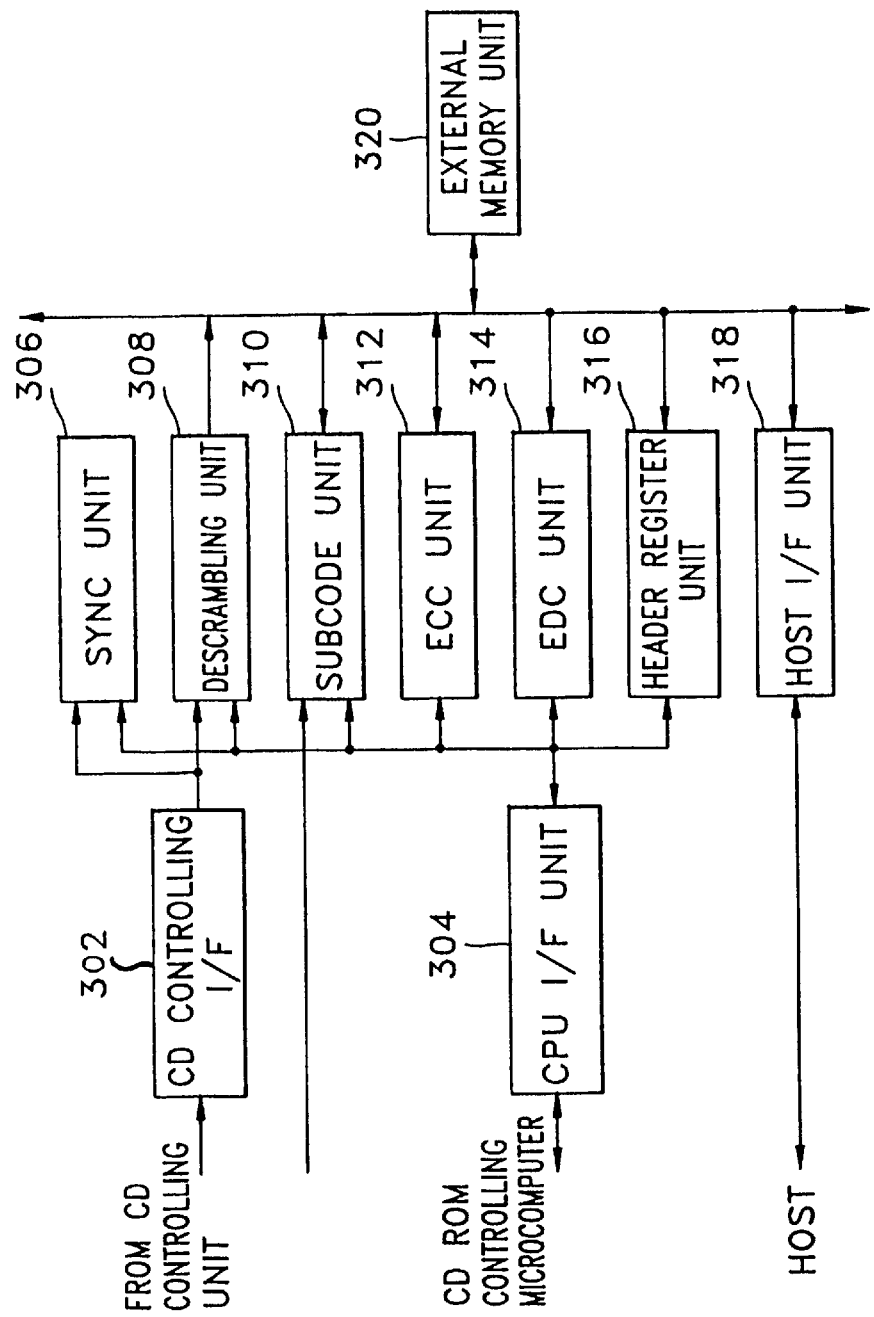
FIG. 3 is a detailed block diagram of functional units connected to the external memory unit shown in FIG. 1.

Referring to FIG. 3 which shows a plurality of functional units connected to an external memory unit 320, and a CD controlling interface (I/F) unit 302 for providing an interface with CD controlling unit 100 shown in FIG. 1 which outputs picked-up data received in units of bytes to CD decoding unit 114 shown in FIG. 1, according to a byte clock.

A synchronizing unit 306 receives the data in units of bytes and detects a sync pattern of a CD-ROM data block which is composed of 2,352 bytes. A descrambling unit 308 descrambles the bytes of the CD-ROM data block, except for the bytes used in detecting the sync pattern, which corresponds to decoding 2,340 bytes. Then, buffering is performed by storing the descrambled data in external memory unit 320 in units of a CD-ROM data block.

An error correction code (ECC) unit 312, an error detection code (EDC) unit 314 and a header register unit 316 sequentially perform error correction with respect to the CD-ROM data block stored in external memory unit 320. The error corrected CD-ROM data blocks are transmitted to a host (not shown) via a host interface (I/F) unit 318.

The subcode unit 310 stores the subcode data generated by CD controlling unit 100 in external memory unit 320.

A CPU I/F unit 304 provides an interface between blocks 306 through 316 shown in FIG. 3 and CD-ROM controlling microcomputer 116. The CD-ROM controlling microcomputer 116 shown in FIG. 1 controls blocks 306 through 316 and accesses data stored in external memory unit 320.

Figure 4:
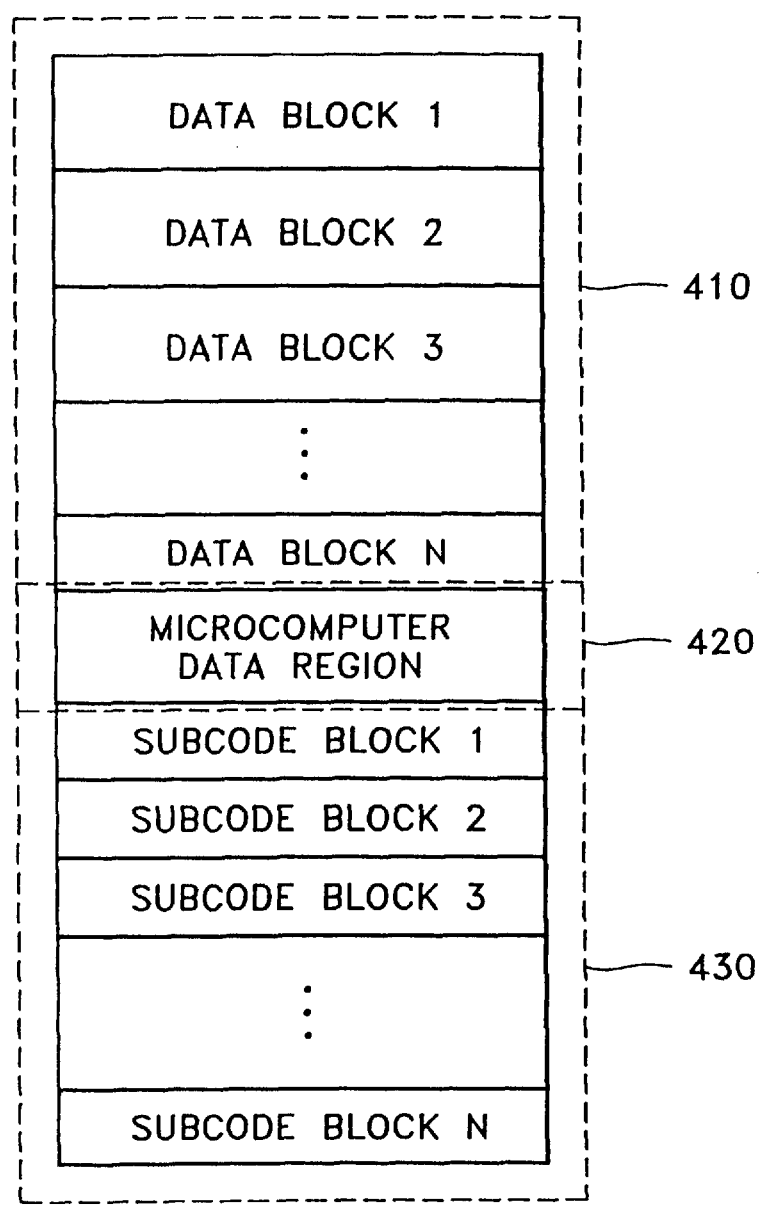
FIG. 4 shows data regions in the external memory unit shown in FIG. 3.

Referring to FIG. 4, which shows the data regions of the external memory 320 shown in FIG. 3, the external memory 320 is divided into a CD-ROM data region 410, a microcomputer data region 420 and a subcode data region 430. Here, each CD-ROM data block in the CD-ROM data region 410 preferably consists of 2,352 bytes.

The CD-ROM decoder accesses external memory 320 according to addresses generated based on the number of the data block currently being processed. To produce the physical address corresponding to the data, CD-ROM controlling microcomputer-116 shown in FIG. 1 designates a block pointer, i.e. the number of the CD-ROM data block, and an offset address, multiplies the block pointer by the size of a block, and adds the offset address thereto. In the case of a subcode, the address is generated by multiplying the block pointer by the size of a subcode block and then adding the offset address thereto to generate the address.

The CD-ROM microcomputer region 420 of external memory unit 320 is accessed based on the physical address directly allotted by CD-ROM controlling microcomputer 116, and the subcodes are stored in the subcode data region 430.

Figure 5:
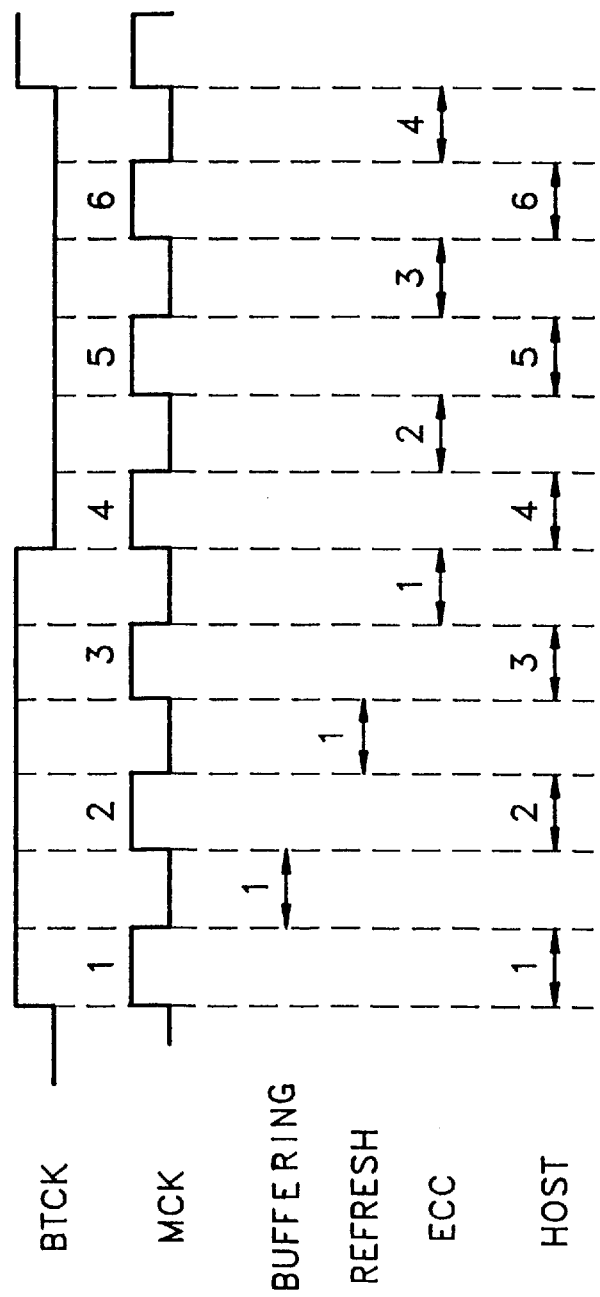
FIG. 5 is a timing chart illustrating an external memory controlling method according to the present invention.

Referring to FIG. 5, when 2,352 bytes of data are transmitted from first signal processing unit 110, at a rate of one byte per period of a byte clock (BTCK), the second signal processing unit 118 combines those 2,352 bytes of data into a CD-ROM data block and stores the same in an external memory. However, access to the external memory is also required in order to perform buffering, error correction, transmission of pickup data to a host, subcode storage, read and write operations of the CD controlling microcomputer and a refresh cycle applied for a DRAM. One period of the byte clock BTCK should preferably correspond to six periods of a master clock MCK so that such memory accessing operations can be performed without being influenced by other operations.

Here, all high level portions of the master clock serve for transmitting pickup data to the host, the low level portions of the 3rd to the 6th periods of the master clock serve for performing error correction, and the first low level portion of the master clock serves for performing a buffering operation. The second low level portion of the master clock serves for performing a refresh cycle, subcode storage, and the read and write operations of the microcomputer, which are performed by a external memory controlling block shown in FIG. 6, according to a predetermined priority scheme.

Figure 6:
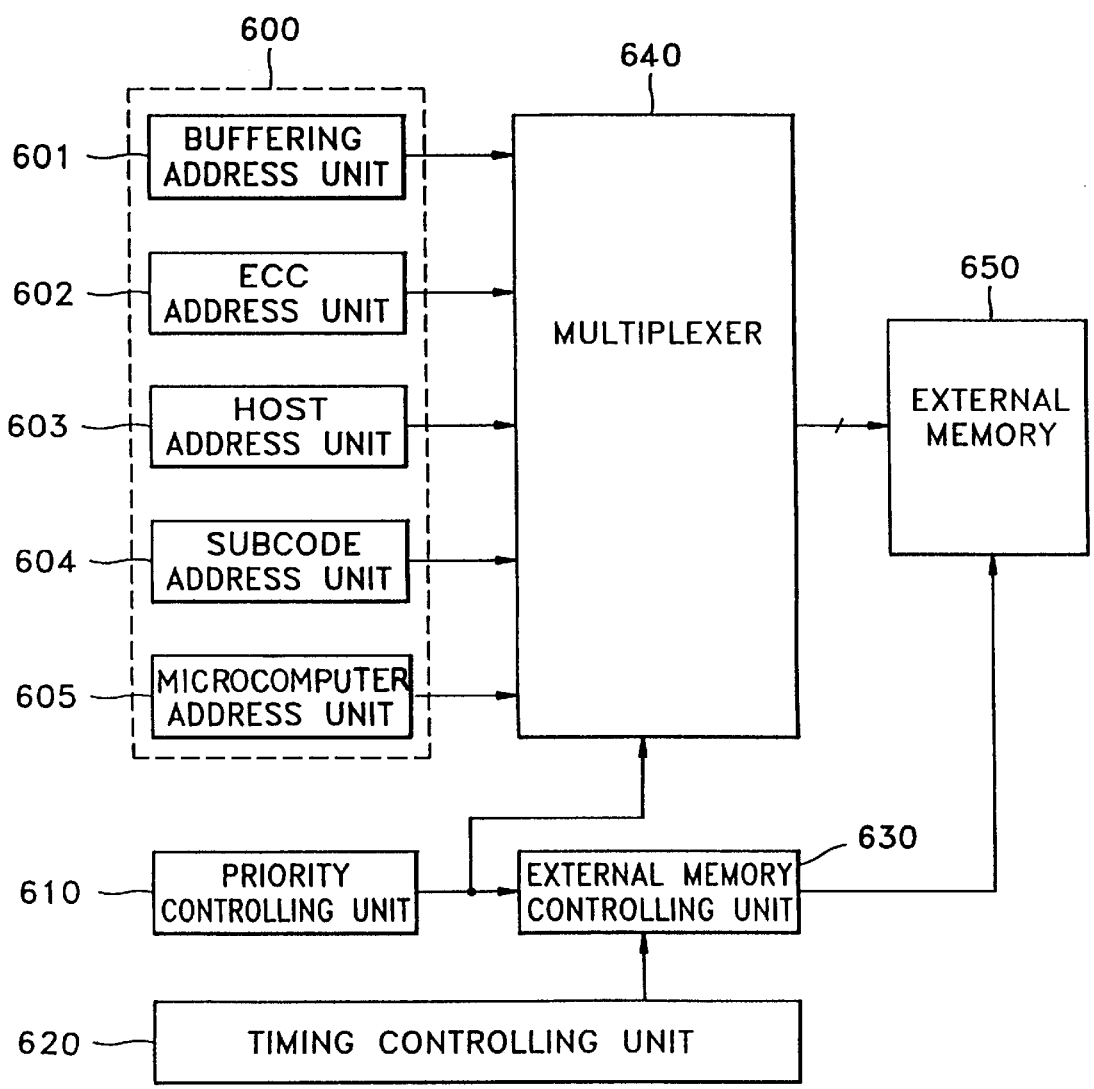
FIG. 6 is a block diagram of an external memory access control apparatus according to the present invention.

Referring to FIG. 6, the external memory controlling block includes an address generating unit 600, a priority controlling unit 610, a timing controlling unit 620, an external memory controlling unit 630, a multiplexer 640 and an external memory 650.

The address generating unit 600 includes a buffering address unit 601 for generating a corresponding address for accessing the external memory 650 when performing various operations, an ECC address unit 602, a host address unit 603, a subcode address unit 604 and a microcomputer address unit 605.

The buffering address unit 601 generates an address for storing in external memory 650 the data received from the CD controlling unit (see FIG. 1) which has undergone sync pattern detection and descrambling. The error correction address unit 602 generates an address used in performing error correction by the CD decoder 114 shown in FIG. 1. The host address unit 603 generates an address for reading data from external memory 650 according to a data transmission request from the host (not shown). The subcode address unit 604 generates an address for storing in external memory 650 the subcode data generated in CD controlling unit 100, shown in FIG. 1, which is stored in units of subcode blocks, and the microcomputer address unit 605 generates an address allowing the CD-ROM controlling microcomputer 116 to directly read from and write to external memory 650.

When three operations are requested at the same time, e.g., performing a refresh cycle, subcode storage and microcomputer accessing, priority controlling unit 610 provides control such that these operations can be sequentially performed based on priority. The external memory controlling unit 630 generates a memory controlling signal in synchronization with the clock signal generated in timing controlling unit 620. In addition, external memory controlling unit 630 receives a control signal from priority controlling unit 610 and outputs an external memory controlling signal for accessing external memory 650. Moreover, external memory controlling unit 630 having received the control signal from priority controlling unit 610, outputs an external memory controlling signal to allow accessing of external memory 650.

The multiplexer 640 selects the corresponding addresses for the buffering, ECC, subcode processing, transmission of data to the host and microcomputer accessing operations according to the control signal output from priority controlling unit 610, and outputs the selected address to external memory 650.

Because the period for performing subcode storage or microcomputer data accessing operations of external memory 650 is very long, if a portion of the current master clock period is preferably allotted as the refresh cycle, priority controlling unit 610 provides a control signal such that a refresh operation is performed first regardless of other cyclic operations. Next, if the microcomputer accessing and subcode storage operations are requested at the same time, priority controlling unit 610, preferably controls priority such that subcodes can be stored first and then the microcomputer accessing operations are performed.

The thus-generated addresses are selected by multiplexer 640 to provide access to external memory 650 for the respective operations, according to the corresponding portions of the master clock as shown in FIG. 5.

As described above, the apparatus and method for controlling an external memory for a CD-ROM decoder according to a preferred embodiment of the present invention sequentially performs, based on a priority scheme, refresh, subcode storage and read and write operations of microcomputer data each allotted to a predetermined portion of a period of the master clock. Thus, it is possible to perform a variety of functions without affecting processing speed during buffering or error correction of a CD-ROM, or during transmission of data to a host.

Although a preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method for controlling an external memory for a compact disk read-only-memory (CD-ROM) decoder which transmits CD-ROM data picked-up from a disk to a host under control of a CD-ROM controlling microcomputer, in which one-byte of data is transmitted during one period of a byte clock, and which has a master clock portions of which are allocated for different functions in synchronization with the period of the byte clock, the method for controlling the external memory comprises:

outputting the byte clock upon an occurrence of a predetermined number of periods of the master clock, wherein the byte clock and the master clock each have first and second levels;

allotting a portion of a first period of the master clock having the first level for performing a buffering operation;

allotting a portion of a second period of the master clock having the first level for performing one of a refresh cycle operation, a subcode storage operation, and data read and write operations of the CD-ROM controlling microcomputer with respect to the external memory;

allotting a portion of third through said predetermined number of periods of the master clock having the first level for performing an error correction operation; and allotting a portion of said first through said predetermined number of periods of said master clock having the second level for transmitting the picked-up CD-ROM data to the host, whereby said external memory is accessed.

2. The method for controlling an external memory as recited in claim 1, wherein said predetermined number of master clock signals is six.

3. The method for controlling an external memory as recited in claim 1, wherein said first level is the complement of said second level.

4. The method for controlling an external memory as recited in claim 1, wherein said first level is a low level and said second level is a high level.

5. The method for controlling an external memory as recited in claim 1, wherein when a plurality of accesses of the external memory are requested in the portion of the second period of said master clock having the first level, said refresh cycle, said subcode storage, and said data read and write operations of said CD-ROM controlling microcomputer are sequentially performed based on a priority during the corresponding portion of the second period having the first level.

6. An external memory controller for a compact disk read-only-memory (CD-ROM) decoder, comprising:

a memory unit;

an address generating unit for generating a plurality of addresses for accessing said memory unit based on a function to be performed;

a priority controlling unit for generating a priority signal indicating a priority of said function to be performed;

a multiplexer which receives said plurality of address and outputs one of said plurality of addresses based on said priority signal;

a timing control unit for generating a clock signal;

a memory control unit generating a memory control signal based on the clock signal and outputting said memory control signal to said memory unit to controlling said memory unit to provide access to said address of said memory unit, wherein said clock signal has first and second levels, and wherein;

said memory control unit outputs said memory control signal during a portion of a first period of the clock having the first level when the function to be performed is a buffering operation;

said memory control unit outputs said memory control signal during a portion of a second period of the clock signal having the first level when the function to be performed is one of a refresh cycle operation, a subcode storage operation, and data read and write operations of a CD-ROM controlling microcomputer with respect to the external memory;

said memory control unit outputs said memory control signal during a portion of a third through said predetermined number of periods of the master clock having the first level when the function to be performed is an error correction operation; and said memory control unit outputs said memory control signal during a portion of said first through said predetermined number of periods of said clock signal having the second level for transmitting to a host CD-ROM data picked-up from a CD-ROM.

7. The external memory controller recited in claim 6, wherein said memory unit is comprised of:

a CD-ROM data region for storing a CD-ROM data block picked-up from a disk;

a microcomputer data region for storing microcomputer data; and a subcode data region for storing subcodes picked-up from the disk.

8. The external memory controller recited in claim 7, wherein said address generating unit comprises:

a buffering address unit for outputting an address of said memory unit for buffering data;

an error correction code (ECC) addressing unit for outputting an address of said memory unit for one of storing or retrieving ECC data from an ECC unit;

a host address unit for outputting an address of said memory unit for retrieving requested by a host;

a subcode address unit for outputting an address of said memory unit within said subcode data region for one of storing or retrieving subcodes picked-up from said disk; and a microcomputer address unit outputting an address of said memory unit within said microcomputer data region for one of storing or retrieving microcomputer data.

* * * * *